United States Patent [19]
Ohta

[11] Patent Number: 6,023,589
[45] Date of Patent: Feb. 8, 2000

[54] OPTICAL APPARATUS

[75] Inventor: Seiya Ohta, Yokohama, Japan

[73] Assignee: Canon Kabushiki Kaisha, Tokyo, Japan

[21] Appl. No.: 09/185,951

[22] Filed: Nov. 4, 1998

[30] Foreign Application Priority Data

Nov. 11, 1997 [JP] Japan ..................................... 9 325253

[51] Int. Cl.[7] .................................................. G03B 13/36
[52] U.S. Cl. .............................................. 396/80; 396/97
[58] Field of Search .................................. 396/97, 79, 80, 396/81; 359/820, 694, 696, 697, 698; 348/345, 347

[56] References Cited

U.S. PATENT DOCUMENTS

5,985,129  4/1999  Ohta ........................................... 396/79

Primary Examiner—W. B. Perkey
Attorney, Agent, or Firm—Robin, Blecker & Daley

[57] ABSTRACT

An optical apparatus for forming an object image on an image forming plane by using an optical system including a moving lens group for focus adjustment, includes a lens driving mechanism which drives the moving lens group, a control circuit which drives and controls the lens driving mechanism on the basis of control information provided for driving and controlling the moving lens group, and a temperature and/or humidity detecting sensor for detecting information on temperature and/or humidity, wherein the control circuit computes a correction amount by which a driving limit of the moving lens group toward a nearest-distance end or infinity-distance end for focus adjustment is variable, according to a temperature and/or humidity detection output of the temperature and/or humidity detecting sensor, and drives and controls the lens driving mechanism on the basis of the correction amount and the control information, so that the object image can be formed on the image forming plane of the optical system without shifting due to variations of temperature and/or variations of humidity.

42 Claims, 8 Drawing Sheets

OPTICAL APPARATUS

BACKGROUND OF THE INVENTION

1. Field of the Invention

The present invention relates to an optical apparatus, such as a video camera, a silver-halide camera, an electronic still camera or a lens barrel adapted for such apparatuses.

2. Description of Related Art

In the field of the optical apparatuses such as cameras and the like, a trend of reducing the size of a photo-taking optical system and the diameter of the image size of a solid-state image sensor has rapidly advanced during recent years. Meanwhile, plastic materials are often employed as optical materials for forming photo-taking optical systems.

The use of a plastic material as an optical material facilitates molding lenses with dies in desired shapes and also at a lower cost than the use of a glass material. On account of these advantages, lenses made of plastic materials are often used for forming a viewfinder system, an infrared active automatic focusing unit and also some part of a photo-taking optical system.

However, the variations of physical properties of plastic materials due to variations of environment are greater than those of inorganic glass materials. In respect of a coefficient of linear expansion, for example, a plastic material called "PMMA" is $67.9 \times 10^{-6}/°$ C. in representative value, while that of an inorganic glass material called "LaK 14" (manufactured by OHARA Co.) is $57 \times 10^{-7}/°$ C., which is smaller than the former by one place. Further, with respect to variations of refractive index due to variations of temperature, the value of the material "PMMA" is 1.0 to $1.2 \times 10^{-4}/°$ C., while that of the inorganic glass material "LaK 14", in D line, is 3.9 to $4.4 \times 10^{-6}/°$ C., which is smaller than the former by two places.

The optical constants (such as a refractive index and shape, etc.) of the plastic material are thus caused to vary by temperature variations to a much greater extent than those of the inorganic glass material. Therefore, compared with a lens made of an inorganic glass material, the so-called plastic lens which is made of a plastic material varies in focal length, for example, to a greater extent for variations of temperature.

Further, the water absorption of the plastic material is greater than that of the inorganic glass material. Therefore, variations of humidity, like temperature, also causes the optical constants of a plastic lens to vary to a greater extent than those of a lens made of an inorganic glass material.

Hence, an optical system consisting in part of a plastic lens is inferior in optical performance to an optical system consisting of lenses made of an inorganic glass material, as the optical properties such as focal length, etc., of the former will be caused to vary by temperature and humidity variations to a greater degree than those of the latter.

Further, the same variations of optical constants as those mentioned above tend to result from use of a plastic material also for a lens holding member arranged to hold a lens.

Meanwhile, some of optical apparatuses, such as a video camera or the like, have presented a problem in that the lens control of the apparatus cannot be adequately accomplished as the image forming position (focus position) of an optical system is caused to deviate by variations in environmental conditions. The adverse effect of such focus deviation due to variations of environment becomes more conspicuous, because the quality of images has come to be improved further by the advancement of digital technology. This problem, therefore, has become serious.

Manufacturers are these days competing for increase in zoom magnifying rate and decrease in size of an optical system. As a result, however, the amount of defocus on a prescribed image forming plane due to variations of temperature or humidity has increased to present a very serious problem.

In a case where a focus driving range of a focusing lens is set for a normal temperature, in particular, if an image forming plane is caused to shift by variations of environment (variations in ambient temperature or humidity), it becomes hardly possible to adequately carry out a focusing action.

To solve the above-stated problem, the focus driving range may be set to include some allowance for the shift of the image forming plane due to variations of environment. Adoption of such a solution, however, would cause the focusing lens to be driven to such a position that is located outside of a range of focusing positions and would require an unnecessarily long time in focusing on an object image. That solution lowers the performance of an AF function and is, therefore, not desirable for an optical apparatus.

In another conceivable solution, the focusing lens driving range may be set and kept in storage in such a way as to include all in-focus positions that correspond to such variations in in-focus position that are expected to be caused by variations of temperature. However, the arrangement of storing all such in-focus positions that correspond to variations of temperature requires a huge storage capacity, which would result in an excessive increase in cost and price of the optical apparatus.

BRIEF SUMMARY OF THE INVENTION

In accordance with one aspect of the invention, there is provided an optical apparatus in which a temperature and/or humidity is detected, and a movement limit of a moving lens for focus adjustment is changed on the basis of the detected temperature and/or humidity, so that a length of time required in focusing can be minimized even in the event of variations in environment conditions such as temperature and/or humidity.

The above and other aspects of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.
(First Embodiment)

Figure 1:
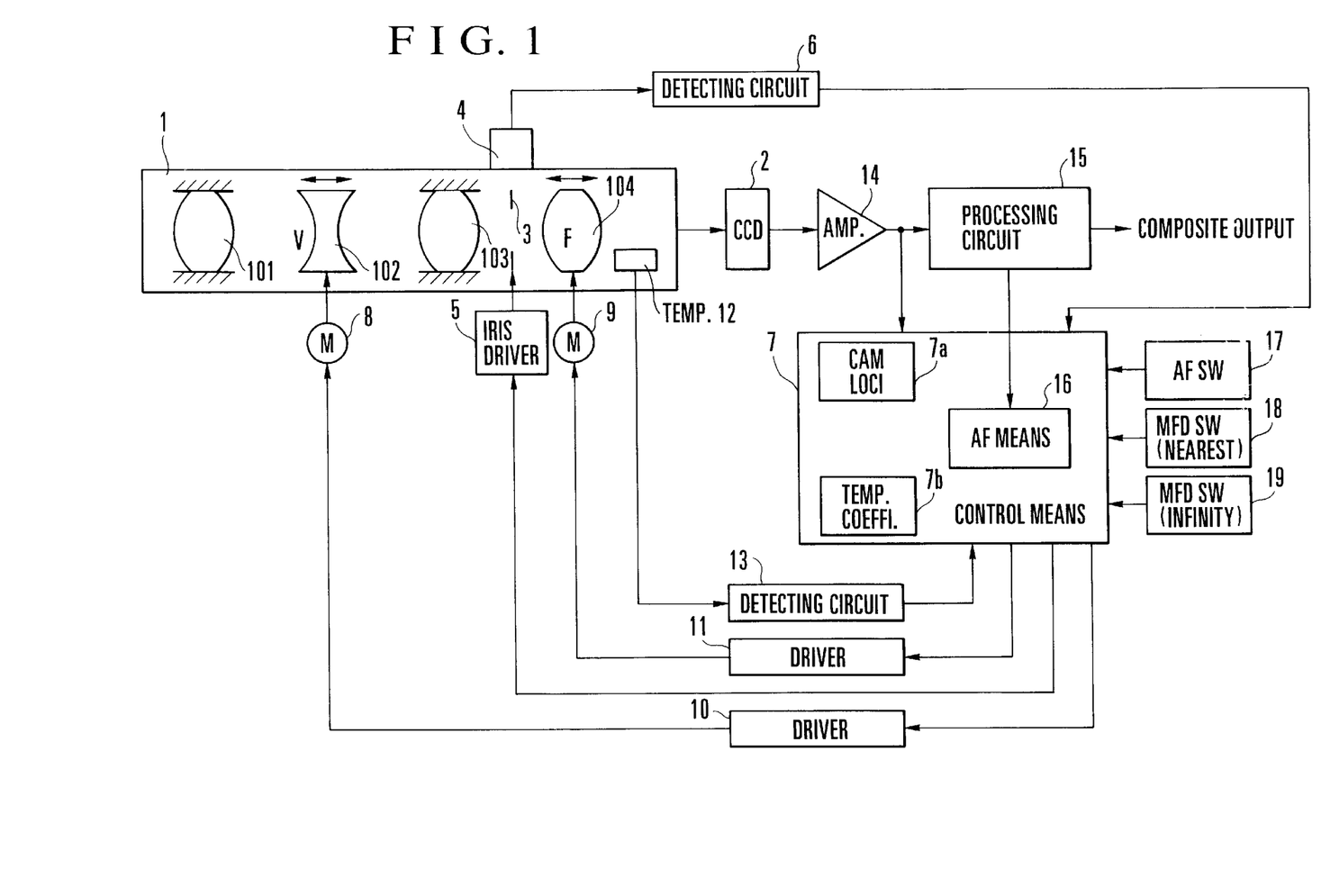
FIG. 1 is a block diagram showing an optical apparatus according to a first embodiment of the invention.

FIG. 1 is a block diagram showing an optical apparatus arranged according to a first embodiment of the invention. In the case of the first embodiment, the invention is applied, by way of example, to a video camera as an optical apparatus.

In FIG. 1, an optical system 1 is a rear-focus type zoom lens (hereinafter referred to as "RFZ lens") composed of four lens groups. The RFZ lens 1 includes a first lens group 101 which is a fixed lens group (hereinafter referred to as "front lens"), a second lens group 102 which is a moving lens group having a magnification varying function (hereinafter referred to as "variator lens"), a third lens group 103 which is a fixed lens group (hereinafter referred to as "afocal lens"), and a fourth lens group 104 which is a moving lens group having a focusing function and a compensating function for correcting the shift of an image forming plane caused by the magnification varying action (hereinafter referred to as "RR lens"). Each of these lens groups is composed of a plurality of lenses. No particular limitation is set to the number of lenses of each of these lens groups.

In the case of the first embodiment, at least one of lenses of each lens group is a plastic lens made of plastic material. In accordance with the invention, however, the material of the plastic lens is not particularly limited to any specific material but can be selected from among a group of plastic materials such as the materials of an acrylic system, a polyolefin system, a polycarbonate system, etc.

Further, in accordance with the invention, the plastic lens may be used in any desired position within each lens group or may be not used at all.

The RFZ lens 1 is provided with a zoom position detecting means (first position detecting means) (not shown) for detecting the initial position of the variator lens 102, and a focus position detecting means (a second position detecting means) (not shown) for detecting the initial position of the RR lens 104. Each of these position detecting means is arranged to detect the position of a light blocking plate which moves together with the lens by means of a photo-interrupter or the like and to send a signal to a control means 7. The control means 7 uses this signal as initial position setting data in driving and controlling the variator lens 102 or the RR lens 104.

The video camera further includes a photoelectric conversion element 2 composed of a CCD or the like, an iris member 3 provided for adjustment of the quantity of light incident on the photo electric conversion element 2, an iris position detecting means 4, and an iris driving means 5 for driving the iris member 3 in such a way as to make the quantity of light incident on the photoelectric conversion element 2 constant under the control of the control means 7. A detecting circuit 6 is arranged to detect the output of the iris position detecting means 4 and to send its detection output to the control means 7.

Driving means 8 and 9 are stepping motors or the like which are arranged to drive the moving lens groups 102 and 104. Drivers 10 and 11 are arranged to drive the driving means 8 and 9.

Temperature detecting means 12 is a thermistor, a temperature transducing resistor or the like. A detecting circuit 13 is arrange to detect the output of the temperature detecting means 12 and to send its detection output to the control means 7.

An amplifier 14 is arranged to amplify the output of the photoelectric conversion element 2. A processing circuit 15 is arranged to convert a signal outputted from the amplifier 14 into a signal such as a video signal of the NTSC system. Automatic focusing means 16 is arranged to form a signal for automatic focusing (hereinafter referred to as AF) from the signal coming from the processing circuit 15 and to cause an AF action to be carried out. A switch 17 is provided for turning on and off the AF action. Further, the AF action can be carried out, for example, in accordance with the so-called hill-climbing method disclosed in Japanese Laid-Open Patent Application No. SHO 62-103616 (U.S. Pat. No. 4,804,831), etc.

Switches 18 and 19 are provided for manual focus adjustment (hereinafter referred to as MFD). The RR lens 104 can be manually driven to move toward the nearest-distance position by turning on the switch 18 and toward the infinity-distance position by turning on the switch 19.

The RFZ lens 1 is arranged to have the RR lens 104 at each of stop positions on an optical axis which are preset in relation to the stop (zoom) positions on the optical axis of the variator lens 102, for each of different object distances, for the purpose of varying magnification while maintaining an in-focus state.

Figure 2:
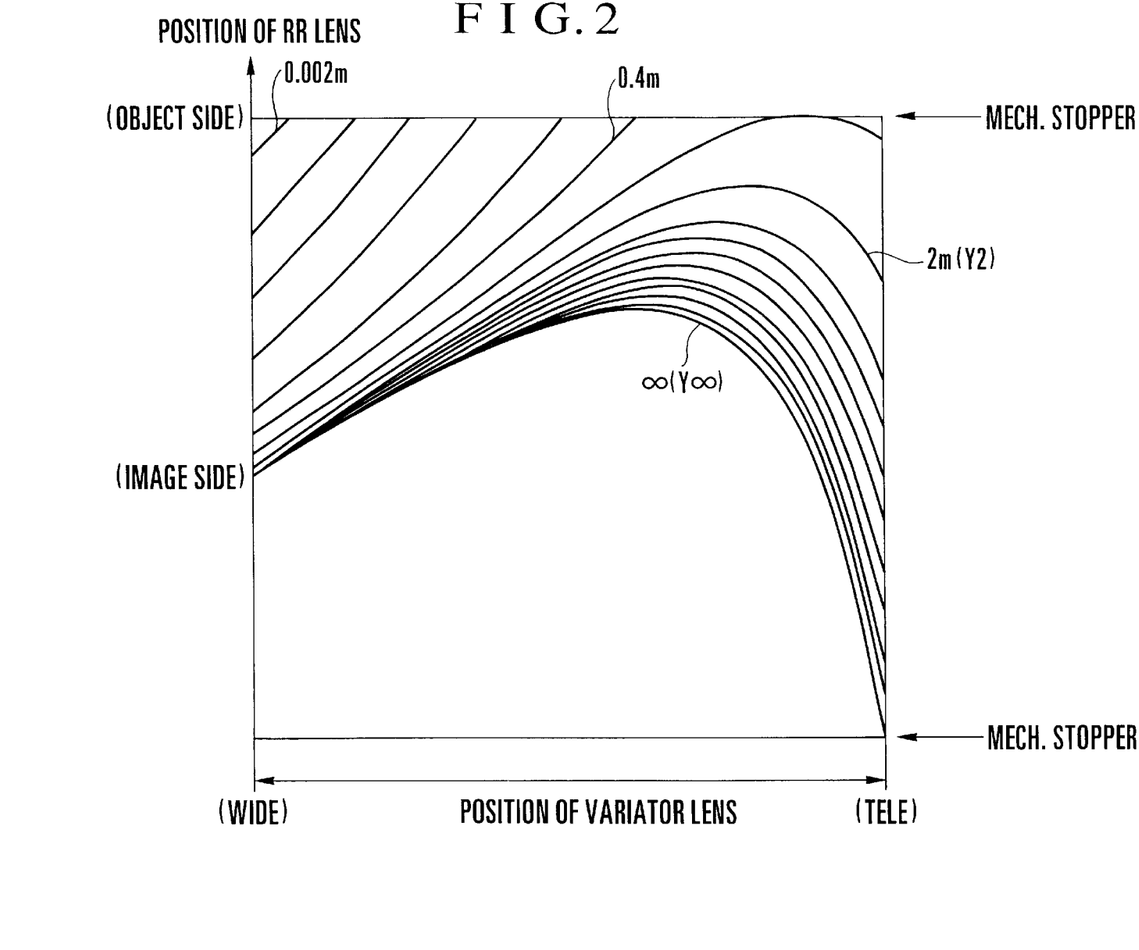
FIG. 2 is a diagram for explaining cam loci of moving lens groups of the optical apparatus according to the first embodiment.

FIG. 2 shows cam loci (position data) indicating the stop positions on the optical axis of the variator lens 102 and the RR lens 104 for different object distances. The cam loci are stored, as control information, in a cam-loci storage part 7a of the control means 7.

Referring to FIG. 2, if the variator lens 102 moves from a wide-angle end position to a telephoto end position on the optical axis when the object distance is at an infinity distance ($\infty$), for example, the RR lens 104 moves along a curve Y$\infty$ which is a locus convex toward the object side, on the optical axis according to the position of the variator lens 102.

In the case of the first embodiment, the variator lens 102 and the RR lens 104 are thus controlled and driven in such a way as to trace the cam loci according to the object distance when the RFZ lens 1 is zoomed from the wide-angle end position to the telephoto end position or from the telephoto end position to the wide-angle end position, so that good images can be obtained without defocusing.

The first embodiment is arranged to use a plastic lens for at least one of the lens groups. Therefore, when variations of environment, such as variations in temperature or humidity take place around the plastic lens, the shape or refractive index of the plastic lens varies to cause some change in focal length, as mentioned in the foregoing. As a result, an image forming plane obtained when the temperature or humidity has varied deviates from an image forming plane obtained at a predetermined reference temperature or reference humidity, thereby bringing about an out-of-focus state.

Referring again to FIG. 2, points located below the infinity-distance locus Y$\infty$ represent out-of-focus positions in general. Therefore, an infinity-distance end is set on the basis of the infinity-distance locus, so that the focusing action can be prevented from being performed to an extent more than necessary. A nearest-distance end of the cam locus likewise can be set on the side of the nearest distance. In some case, such as a case where the image forming plane is caused to shift by a change in ambient temperature, the RR lens 104 might fail to reach an in-focus position at the infinity-distance end or nearest-distance end decided in the above-stated manner. Then, if the image forming plane shifts too much due to a change of temperature, the focus position would deviate to bring about an excessive blur hardly acceptable for an optical apparatus.

Figure 3:
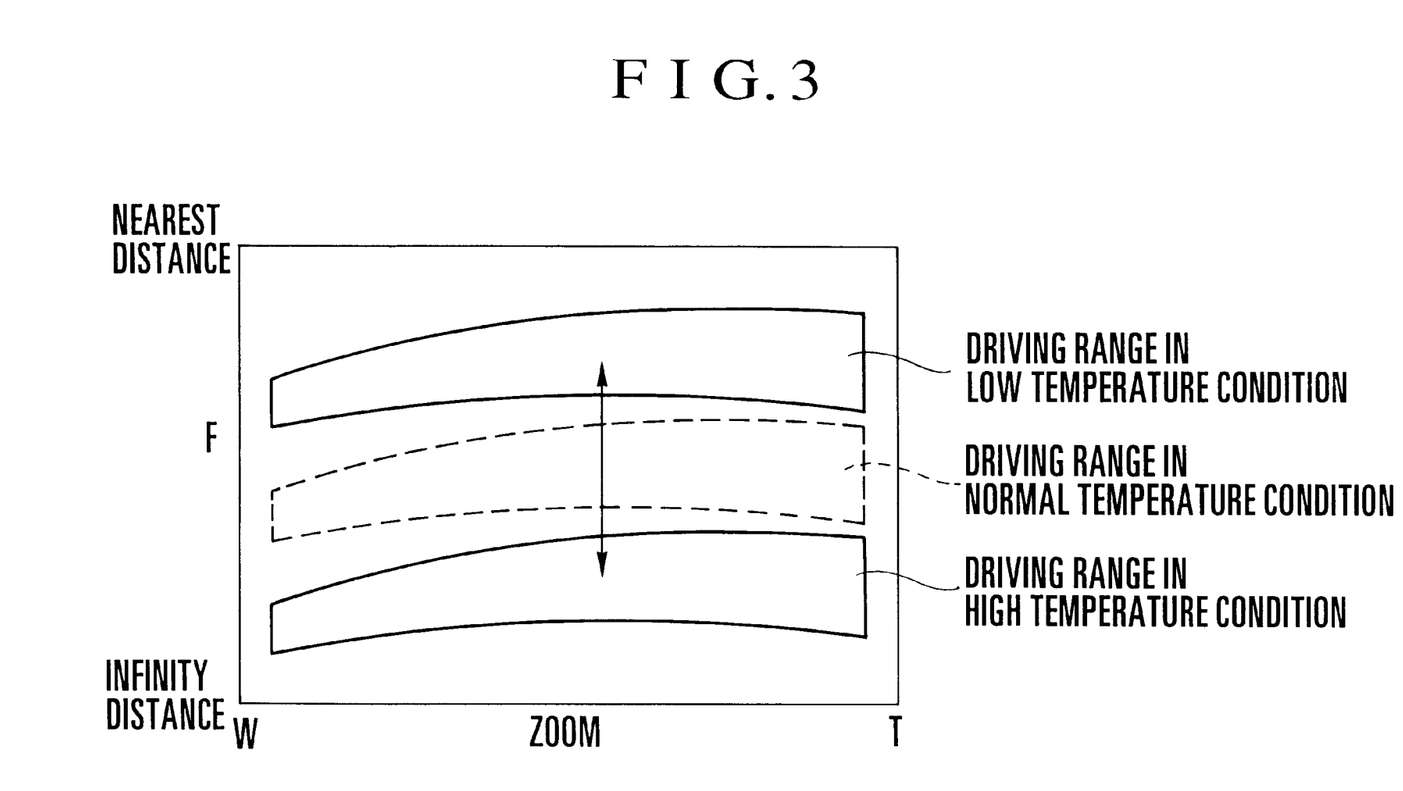
FIG. 3 is a diagram for explaining variations of the range of in-focus positions due to variations of temperature.

FIG. 3 schematically shows the in-focus position ranges of focusing obtained under conditions of having temperature variations. As shown, an in-focus position varies under low and high temperatures. The in-focus position of the RR lens 104 under a normal temperature is obtained within a range (driving range at the normal temperature) indicated by a broken line in FIG. 3. This range is caused to vary by variations of temperature to a range (driving range at the low or high temperature) indicated by a full line in FIG. 3.

Further, in order to enhance the performance of AF and to minimize a length of time required for focusing, the AF control is performed to set the focusing lens driving range for the normal temperature as shown in FIG. 3 according to the position data of the cam locus. Therefore, in a case where the image forming plane is caused to shift by variations of temperature, the RR lens 104 tends to fail to reach an in-focus position.

Such variations of in-focus position of focusing and the shift of the image forming plane which results therefrom are caused not only by variations of temperature but also by variations of humidity. This embodiment is arranged to act as follows in a case where temperature varies as one of variations in environmental conditions.

In the first embodiment, the control means 7 computes the amount of deviation of the in-focus position of focusing due to the variations of temperature, adds or subtracts the computed amount of deviation to or from the position data for the nearest-distance end and the infinity-distance end of cam locus data set for a predetermined reference temperature, and drives and controls the RR lens 104 through the driving means 9 on the basis of the cam locus data thus obtained. By virtue of these processes, the length of time required for a focusing action on an object image can be shortened, and the object image can be adequately formed on the image forming plane without shifting due to variations of temperature.

The control means 7 has a temperature coefficient storage part 7b. For computing the amount of deviation of the in-focus position of focusing due to variations of temperature, i.e., a correction amount for adjusting and correcting the nearest-distance end and infinity-distance end of cam locus data for the RR lens 104, an amount of deviation of the image forming plane per unit temperature is stored beforehand in the temperature coefficient storage part 7b, as temperature coefficient data Trr. The amount of deviation of the image forming plane is obtained on the basis of data obtained beforehand by computing or actually measuring the amount of shift of the image forming plane resulting from changes in focal length caused by changes in shape and refractive index of the plastic lens or from changes in spacing distance between lenses caused by a change of a lens holding member due to variations of temperature.

Therefore, with a temperature difference between a predetermined reference temperature and a temperature detection output of the temperature detecting means 12 assumed to be Δt, a correction amount Prr to be used for correcting the in-focus position of focusing obtained under variations of temperature can be readily computed and obtained by the following formula:

$$Prr = \Delta t \times Trr \quad (1)$$

The computed correction amount Prr is added to or subtracted from the position data of the nearest-distance end and infinity-distance end of the cam locus data for the predetermined reference temperature to newly set the nearest-distance end and infinity-distance end of the cam locus data.

Figure 4:
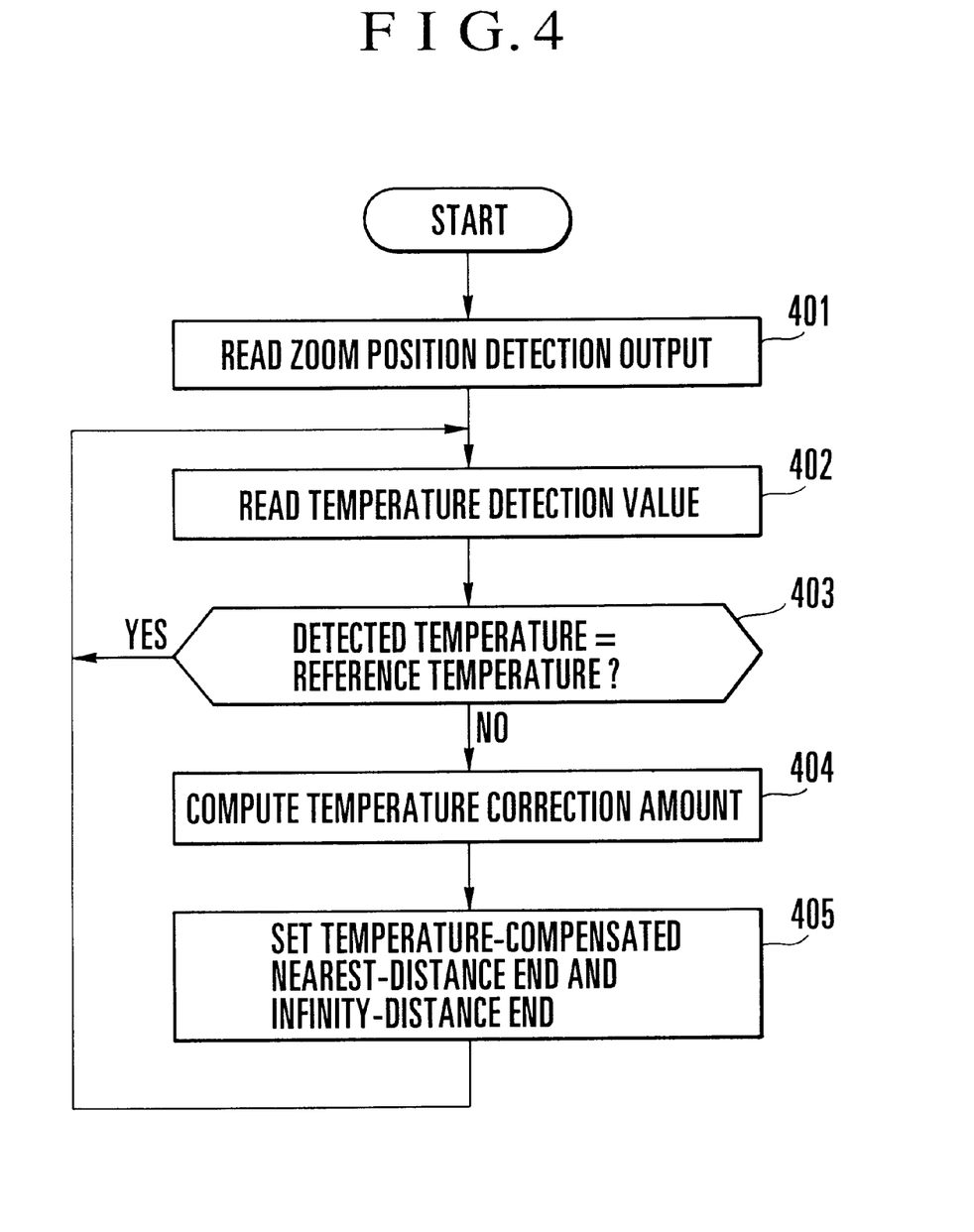
FIG. 4 is a flow chart showing an operation of the optical apparatus according to the first embodiment, for newly setting the nearest-distance end and infinity-distance end of a moving lens group (RR lens).

FIG. 4 shows in a flow chart a flow of operation to be performed by the control means 7 in newly setting the nearest-distance end and infinity-distance end of the RR lens 104.

Referring to FIG. 4, the output of the zoom position detecting means is read at a step 401. At a step 402, the temperature detection output of the temperature detecting means 12 is read. At a step 403, the value of the temperature detection output of the temperature detecting means 12 is compared with the value of the predetermined reference temperature to find if these values are equal to each other. If so, position data of the nearest-distance end and infinity-distance end of the cam locus data in storage is left as it is. If not, the flow proceeds to a step 404. At the step 404, the temperature correction amount Prr to be used for correcting the cam locus data for variations of temperature is computed in accordance with the above formula (1). At a step 405, the correction amount Prr computed is added to or subtracted from the position data of the nearest-distance end and infinity-distance end of the cam locus data set for the reference temperature in such a way as to newly set the position data of the nearest-distance end and infinity-distance end of the cam locus data for the temperature detected at the step 402. It goes without saying that the newly set nearest-distance end and infinity-distance end vary respectively according to the zooming position as shown in FIG. 2. However, with respect to the nearest-distance end, there are some object distances, such as 0.002 or 0.4 m, at which the position of a mechanical stopper virtually becomes the nearest-distance end. Therefore, the RR lens 104 can not always be shifted to the nearest-distance end set in the above-state manner.

When the power supply switch (not shown) of the video camera is turned on, the control means 7 immediately acts according to the flow of operation shown in the flow chart of FIG. 4. Then, position data for the nearest-distance end and infinity-distance end of the cam locus data preset for the reference temperature is either left as it is or newly set according to the temperature indicated by the output of the temperature detecting means 12. When the AF action switch 17 is turned on, the automatic focusing (AF) means 16 is activated to cause the driving means 9 to drive and control the RR lens 104 on the basis of the cam locus data. An object image is thus formed on the image forming plane without shifting due to variations of temperature. Further, if the MFD switch 18 or 19 is turned on while the AF action switch 17 is in its off-state, the driving means 9 is caused to control and drive the RR lens 104 toward the nearest-distance end or infinity-distance end. An object image is thus formed on the image forming plane without shifting due to variations of temperature.

According to the arrangement of the first embodiment, position data of the nearest-distance end and infinity-distance end of the camera locus data for the predetermined reference temperature is changed and corrected according to variations of temperature, and the RR lens 104 is driven according to the corrected cam locus data. By virtue of the arrangement, a length of time required for the focusing action on the object image can be lessened and the object image can be formed on the image forming plane without shifting due variations of temperature.

Therefore, the image pickup performance can be adequately maintained to give accurate image information even under variations of temperature in picking up images not only in the mode of MFD (manual focus adjustment) but also in the mode of using the AF function.

Further, the arrangement of setting a focus driving range by a computing operation on the basis of the cam locus data set for a predetermined reference temperature obviates the necessity of arranging a memory to store in-focus positions of focusing under temperature variations, so that the first embodiment can be simply arranged.

The reference temperature in the first embodiment may be a temperature value obtained at the time of lens adjustment or a value set on the basis of some absolute values, and no particular limitation is imposed thereon. Further, since a possible error in the computed amount of correction decreases accordingly as the reference temperature is set closer to a specific temperature value at which the video camera is most frequently used, the reference temperature value of course can be adequately set according to the environment under which the video camera is expected to be operated.

(Second Embodiment)

A second embodiment of the invention is arranged to act as described below when humidity varies as the variations of environment.

Figure 5:
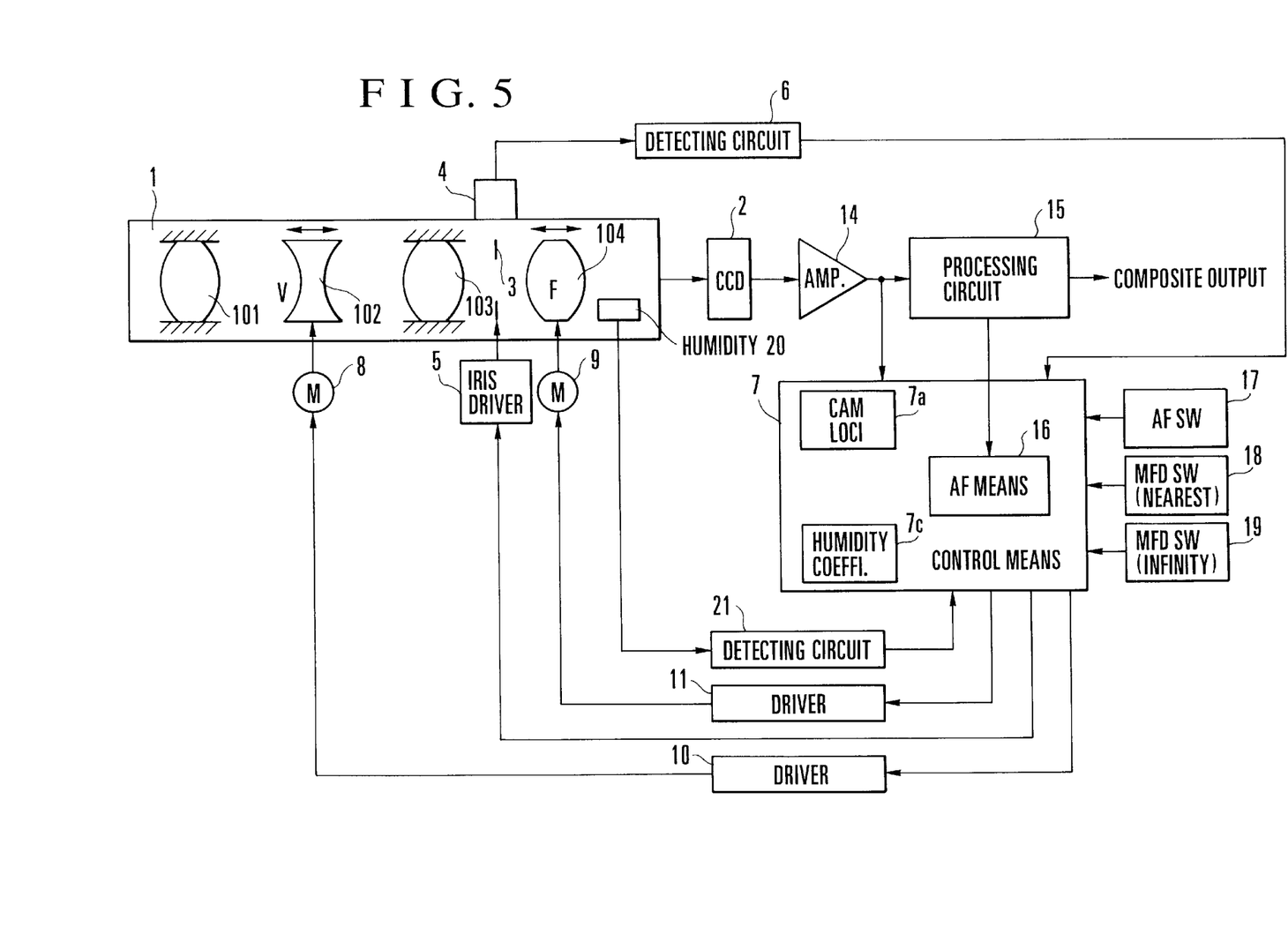
FIG. 5 is a block diagram showing an optical apparatus according to a second embodiment of the invention.

FIG. 5 is a block diagram showing an optical apparatus according to the second embodiment. In FIG. 5, reference numeral 20 denotes humidity detecting means such as an electrostatic condenser type humidity sensor, a thermistor or the like. Reference numeral 21 denotes a detecting circuit provided for the humidity detecting means 20. All members of the second embodiment arranged in the same manner as those of the video camera which is the first embodiment are indicated with the same reference numerals as those used for the first embodiment, and the details of them are omitted from description.

In the case of the second embodiment, the amount of deviation (the amount of correction) of in-focus positions of focusing caused by variations of humidity is computed by the control means 7. The computed amount of deviation is added to or subtracted from the position data of the nearest-distance end and infinity-distance end of cam locus data set for a predetermined humidity to obtain cam locus data compensated for the variations of humidity. Then, the driving means 9 is caused to control and drive the RR lens 104 on the basis of the cam locus data thus obtained. By virtue of these processes, the length of time required for focusing on an object image can be shortened and the object image can be adequately formed on the image forming plane without shifting due to variations of humidity.

The control means 7 has a humidity coefficient storage part 7c. For computing the amount of deviation of the in-focus position of focusing due to variations of humidity, i.e., a correction amount for adjusting and correcting position data of the nearest-distance end and infinity-distance end of the cam locus data for the RR lens 104, an amount of deviation of the image forming plane per unit humidity is stored beforehand in the humidity coefficient storage part 7c, as humidity coefficient data Hrr. The amount of deviation of the image forming plane is obtained on the basis of data obtained beforehand either by computing or by actually measuring the amount of shift of the image forming plane resulting from changes in focal length caused by changes in shape and refractive index of the plastic lens or from changes in spacing distance between lenses caused by a change of a lens holding member due to variations of humidity.

Therefore, with a humidity difference between a predetermined reference humidity and a humidity detection output of the humidity detecting means 20 assumed to be ΔH, a correction amount Prr to be used for correcting the in-focus position of focusing obtained under a condition of humidity variations can be readily computed and obtained by the following formula:

$$Prr = \Delta H \times Hrr \tag{2}$$

The computed correction amount Prr is added to or subtracted from the position data of the nearest-distance end and infinity-distance end of the cam locus data for the predetermined reference humidity to newly set the nearest-distance end and infinity-distance end of the cam locus data. In this case, like in the case of the first embodiment, the nearest-distance end and the infinity-distance end are newly set respectively for each of zooming positions. With respect to the nearest-distance end, also, there are some object distances at which the position of a mechanical stopper virtually becomes the nearest-distance end.

Figure 6:
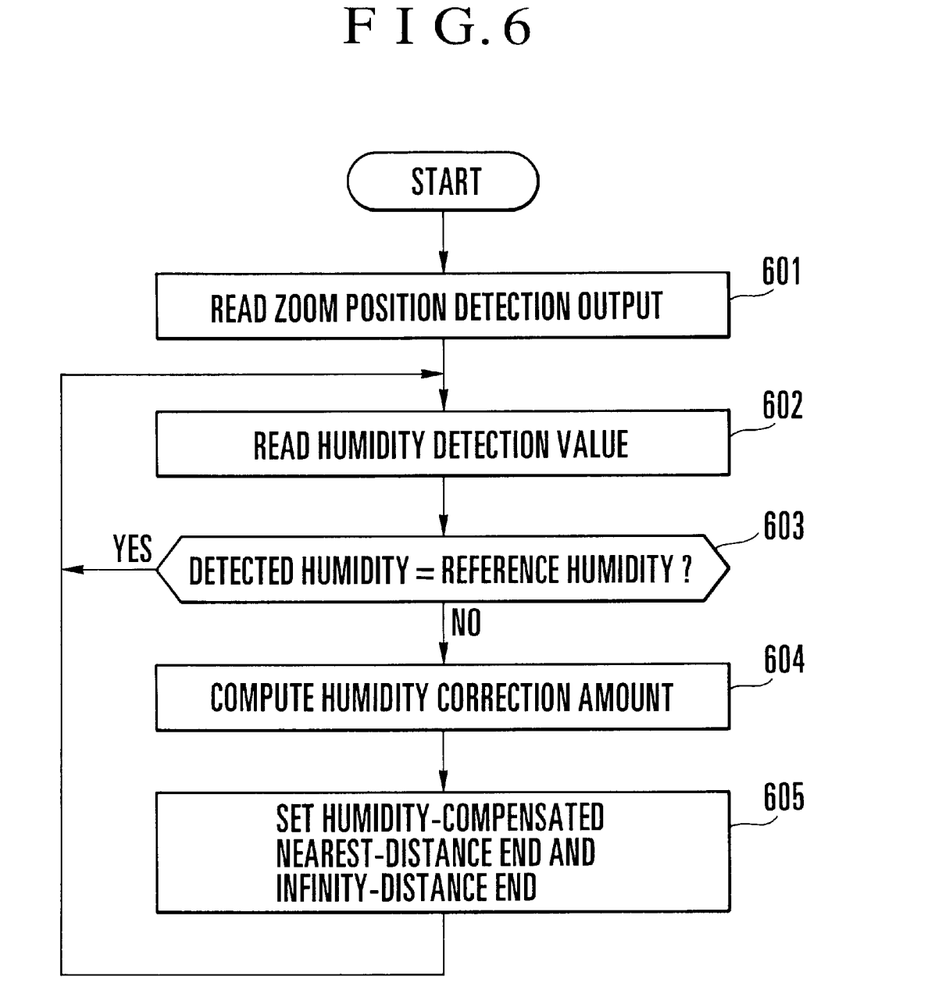
FIG. 6 is a flow chart showing an operation of the optical apparatus according to the second embodiment, for newly setting the nearest-distance end and infinity-distance end of a moving lens group (RR lens).

FIG. 6 shows in a flow chart a flow of operation to be performed by the control means 7 in newly setting the nearest-distance end and infinity-distance end of the RR lens 104.

Referring to FIG. 6, the output of the zoom position detecting means is read at a step 601. At a step 602, the humidity detection output of the humidity detecting means 20 is read. At a step 603, the value of the humidity detection output of the humidity detecting means 20 is compared with the value of the predetermined reference humidity to find if these values are equal to each other. If so, position data of the nearest-distance end and infinity-distance end of the cam locus data in storage is left as it is. If not, the flow proceeds to a step 604. At the step 604, the humidity correction amount Prr to be used for correcting the cam locus data for variations of humidity is computed in accordance with the above formula (2). At a step 605, the correction amount Prr computed is added to or subtracted from the position data of the nearest-distance end and infinity-distance end of the cam locus data set for the reference humidity in such a way as to newly set the position data of the nearest-distance end and infinity-distance end of the cam locus data for the humidity detected.

When the power supply switch (not shown) of the video camera is turned on, the control means 7 immediately acts according to the flow of operation shown in the flow chart of FIG. 6. Then, position data of the nearest-distance end and infinity-distance end of the cam locus data for the reference humidity is either left as it is or newly set according to the humidity indicated by the output of the humidity detecting means 20. When the AF action switch 17 is turned on, the automatic focusing (AF) means 16 is activated to cause the driving means 9 to drive and control the RR lens 104 on the basis of the cam locus data. An object image is thus formed on the image forming plane without shifting due to variations of humidity. Further, in a case where the MFD switch 18 or 19 is turned on while the AF action switch 17 is in its off-state, the driving means 9 is caused to control and drive the RR lens 104 toward the nearest-distance end or infinity-distance end. An object image is thus formed on the image forming plane without shifting due to variations of humidity.

According to the arrangement of the second embodiment, the nearest-distance end and infinity-distance end of the camera locus data for a predetermined reference humidity are changed and corrected according to variations of humidity, and the RR lens 104 is driven according to the corrected cam locus data. By virtue of the arrangement, a length of time required for focusing on an object image can be lessened, and the object image can be adequately formed on the image forming plane without shifting due to variations of humidity.

Therefore, the image pickup performance can be adequately maintained to give accurate image information even under variations of humidity in picking up images not only in the mode of MFD but also in the mode of using the AF function.

Further, the arrangement of setting a focus driving range by a computing operation on the basis of the cam locus data set for a predetermined reference humidity obviates the necessity of arranging a memory to store in-focus positions of focusing under humidity variations, so that the second embodiment can be simply arranged.

The reference humidity for the second embodiment may be a humidity value obtained at the time of lens adjustment or a value set on the basis of some absolute values and no particular limitation is imposed thereon. Further, since a possible error in the computed amount of correction decreases accordingly as the reference humidity is set closer to a humidity value at which the video camera is most frequently used, the reference humidity value of course can be adequately set according to the environment under which the video camera is operated.

(Third Embodiment)

A third embodiment of the invention is arranged to act as described below when both temperature and humidity vary as the variations of environment.

Figure 7:
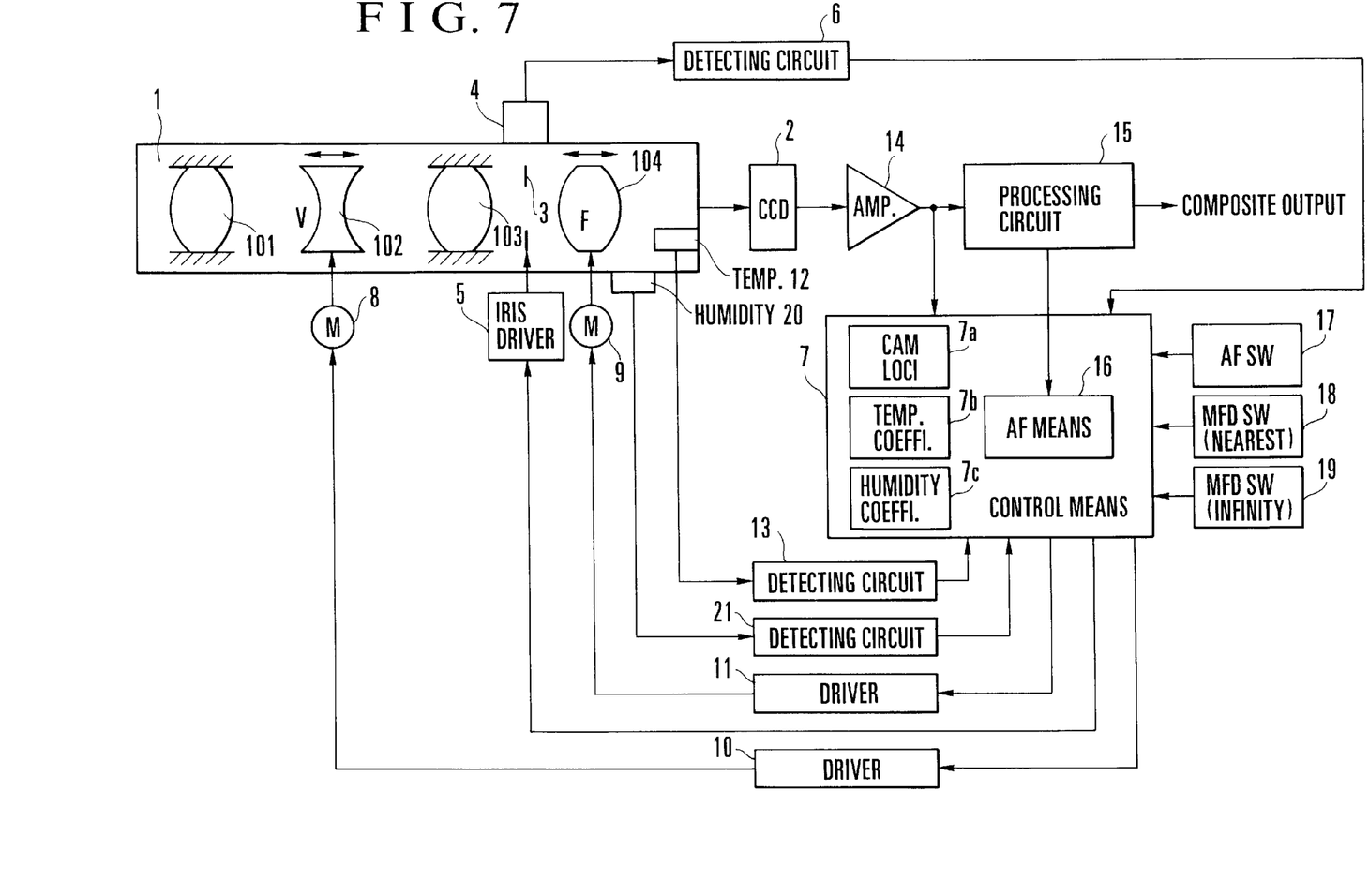
FIG. 7 is a block diagram showing an optical apparatus according to a third embodiment of the invention.

FIG. 7 is a block diagram showing an optical apparatus according to the third embodiment. In FIG. 7, reference numeral 12 denotes temperature detecting means such as a thermistor, a temperature transducing resistor or the like. Reference numeral 13 denotes a detecting circuit provided for the temperature detecting means 12. Reference numeral 20 denotes humidity detecting means such as an electrostatic condenser type humidity sensor, a thermistor or the like. Reference numeral 21 denotes a detecting circuit 21 provided for the humidity detecting means 20. All members of the third embodiment arranged in the same manner as those of the video camera which is the first embodiment are indicated with the same reference numerals as those used for the first embodiment, and the details of them are omitted from description.

In the case of the third embodiment, the amounts of deviation (the amounts of correction) of in-focus positions of focusing caused by variations of temperature and variations of humidity, respectively, are computed by the control means 7. These amounts of deviation are added to or subtracted from the position data of the nearest-distance end and infinity-distance end of cam locus data for a predetermined reference temperature and a predetermined reference humidity to newly set the nearest-distance end and infinity-distance end of the cam locus data. Then, the RR lens 104 is driven and controlled through the driving means 9 on the basis of the cam locus data thus obtained. By virtue of these processes, the length of time required for a focusing action on an object image can be shortened and the object image can be adequately formed on the image forming plane without shifting due to variations of temperature and variations of humidity.

The control means 7 has a temperature coefficient storage part 7b and a humidity coefficient storage part 7c. For computing the amount of deviation of the in-focus position of focusing due to variations of temperature, i.e., a correction amount for adjusting and correcting the nearest-distance end and infinity-distance end of the cam locus data for the RR lens 104, the temperature coefficient storage part 7a stores beforehand an amount of deviation of the image forming plane per unit temperature, as temperature coefficient data Trr. Further, for computing the amount of deviation of the in-focus position of focusing due to variations of humidity, i.e., a correction amount for adjusting and correcting the nearest-distance end and infinity-distance end of the cam locus data for the RR lens 104, the humidity coefficient storage part 7c stores beforehand an amount of deviation of the image forming plane per unit humidity, as humidity coefficient data Hrr. The amounts of deviation of the image forming plane in storage are obtained on the basis of data obtained either by computing or by actually measuring the amount of shift of the image forming plane resulting from changes in focal length caused by changes in shape and refractive index of the plastic lens or from changes in spacing distance between lenses caused by a change of a lens holding member due to variations of temperature and variations of humidity.

Therefore, with a temperature difference between a predetermined reference temperature value and a temperature detection output of the temperature detecting means 12 assumed to be Δt and a humidity difference between a predetermined reference humidity and a humidity detection output of the humidity detecting means 20 to be ΔH, a correction amount Prr to be used for correcting the in-focus position of focusing obtained under a condition of having variations of temperature and variations of humidity can be readily computed and obtained by the following formula:

$$Prr = \Delta t \times Trr + \Delta H \times Hrr \quad (3)$$

Here, with the temperature correction amount assumed to be Tprr and the humidity correction amount to be Hprr, the correction amount Prr can be expressed as follows:

$$Prr = Tprr + Hprr \quad (4)$$

The computed correction amount Prr is added to or subtracted from the position data of the nearest-distance end and infinity-distance end of the cam locus data for the predetermined reference temperature and the predetermined reference humidity to newly set the nearest-distance end and infinity-distance end of the cam locus data.

Figure 8:
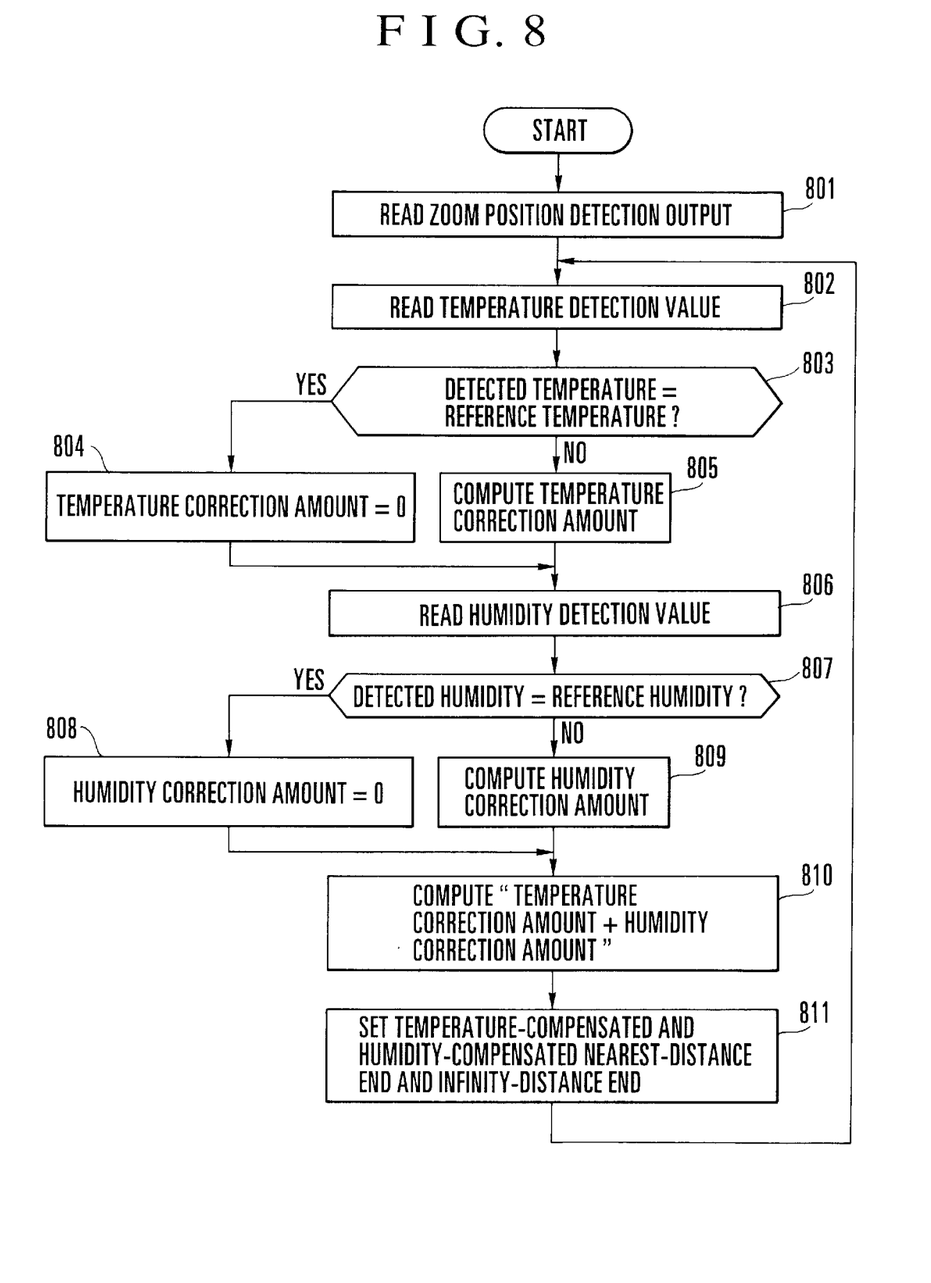
FIG. 8 is a flow chart showing an operation of the optical apparatus according to the third embodiment, for newly setting the nearest-distance end and infinity-distance end of a moving lens group (RR lens).

FIG. 8 shows in a flow chart a flow of operation to be performed by the control means 7 in newly setting the nearest-distance end and infinity-distance end of the RR lens 104.

Referring to FIG. 8, the output of the zoom position detecting means is read at a step 801. At a step 802, the temperature detection output of the temperature detecting means 12 is read. At a step 803, the value of the temperature detection output is compared with the value of the predetermined reference temperature to find if these values are equal to each other. If so, the flow proceeds to a step 804 to have the temperature correction amount Tprr for changing and correcting the cam locus data for temperature variations at zero, and the flow proceeds to a step 806. If not, the flow proceeds to a step 805 to compute the temperature correction amount Tprr for changing and correcting the cam locus data for temperature variations in accordance with the above formula (3).

At the step 806, the humidity detection output of the humidity detecting means 20 is read. At a step 807, the value of the humidity detection output of the humidity detecting means 20 is compared with the value of the predetermined reference humidity to find if these values are equal to each other. If so, the flow proceeds to a step 808 to have the humidity correction amount Hprr for changing and correcting the cam locus data for humidity variations at zero, and the flow proceeds to a step 810. If not, the flow proceeds to a step 809 to compute the humidity correction amount Hprr for changing and correcting the cam locus data in accordance with the above formula (3).

At the step 810, the temperature correction amount Tprr and the humidity correction amount Hprr are added together to obtain the correction amount Prr. At a step 811, the correction amount Prr, which is the sum of the temperature correction amount Tprr and the humidity correction amount Hprr, is added to or subtracted from the position data of the nearest-distance end and infinity-distance end of the cam locum data for the reference temperature and the reference humidity in such a way as to newly set the position data of the nearest-distance end and infinity-distance end of the cam locus data for the temperature and humidity detected.

When the power supply switch (not shown) of the video camera is turned on, the control means 7 immediately acts according to the procedures of the flow chart shown in FIG. 8. Then, position data for the nearest-distance end and infinity-distance end of the cam locus data for the reference temperature and the reference humidity is either left as it is or newly set according to the temperature and the humidity indicated by the outputs of the temperature detecting means 12 and the humidity detecting means 20. When the AF action switch 17 is turned on, the automatic focusing (AF) means 16 is activated to cause the driving means 9 to drive and control the RR lens 104 on the basis of the cam locus data. An object image is thus formed on the image forming plane without shifting due to variations of temperature and variations of humidity. Further, in a case where the MFD switch 18 or 19 is turned on while the AF action switch 17 is in its off-state, the driving means 9 is caused to control and drive the RR lens 104 toward the nearest-distance end or infinity-distance end. An object image is thus formed on the image forming plane without shifting due to variations of temperature and variations of humidity.

According to the arrangement of the third embodiment, the nearest-distance end and infinity-distance end of the camera locus data for the predetermined reference temperature and the predetermined reference humidity are changed and corrected according to variations of temperature and variations of humidity, and the RR lens 104 is driven according to the corrected cam locus data. By virtue of the arrangement, a length of time required for focusing on an object image can be shortened, and the object image can be adequately formed on the image forming plane without shifting due to variations of temperature and variations of humidity.

Therefore, the image pickup performance can be adequately maintained to give accurate image information even under variations of environment conditions in picking up images not only in the mode of MFD but also in the mode of using the AF function.

Further, the arrangement of setting a focus driving range by a computing operation on the basis of the cam locus data set for the predetermined temperature and humidity obviates the necessity of arranging a memory to store in-focus positions of focusing under the conditions of having variations of temperature and variations of humidity, so that the third embodiment can be more simply arranged.

The reference temperature and the reference humidity in the third embodiment mentioned above may be temperature and humidity values obtained, for example, at the time of lens adjustment or values set on the basis of some absolute values and no particular limitation is imposed thereon. Further, possible errors in computed amounts of correction decrease accordingly as the reference temperature and the reference humidity are set closer to such temperature and humidity values at which the video camera is used most frequently. Therefore, the reference temperature and humidity of course can be adequately set according to the environment under which the video camera is operated.

The optical apparatus according to each of the above-described embodiments is capable of adaptively controlling control information, i.e., cam loci, according to the operating environment even in the event of variations of temperature or variations of humidity or both variations of temperature and variations of humidity of the environment. Therefore, it is possible to effectively solve the problem that the lens cannot be brought to an in-focus position during focusing and the problem that an excessively long time is required for an automatic focusing action.

According to each of the above-described embodiments, an optical apparatus is arranged to compute an amount of correction for varying a moving-lens-group driving range for focus adjustment in the direction of a nearest-distance end or an infinity-distance end according to the detection output of the temperature detecting means and/or that of the humidity detecting means, and to ensure that the object image can be formed on the image forming plane of an optical system without shifting due to variations of temperature and/or variations of humidity, by controlling and driving a lens driving means on the basis of the correction amount computed and control information set for driving control over the moving lens. Therefore, it is possible to shorten a length of time required in focusing on an object image, and the object image can be adequately formed on the image forming plane without shifting due to variations of environment conditions.

I claim:

1. An optical apparatus for forming an object image on an image forming plane by using an optical system including a moving lens group for focus adjustment, said optical apparatus comprising:

a lens driving mechanism which drives said moving lens group;

a control circuit which drives and controls said lens driving mechanism on the basis of control information provided for driving and controlling said moving lens group; and temperature detecting means for detecting information on temperature, wherein said control circuit computes a correction amount by which a driving limit of said moving lens group toward a nearest-distance end or infinity-distance end for focus adjustment is variable, according to a temperature detection output of said temperature detecting means, and drives and controls said lens driving mechanism on the basis of the correction amount and the control information, so that the object image can be formed on the image forming plane of said optical system without shifting due to variations of temperature.

2. An optical apparatus for forming an object image on an image forming plane by using an optical system including a moving lens group for focus adjustment, said optical apparatus comprising:

a lens driving mechanism which drives said moving lens group;

a control circuit which drives and controls said moving lens group;

a storage circuit which stores therein control information provided for driving and controlling said moving lens group;

temperature detecting means for detecting information on temperature; and focus detecting means for detecting a focusing state of said optical system, wherein said control circuit computes a correction amount by which a driving limit of said moving lens group toward a nearest-distance end or infinity-distance end for focus adjustment is variable, according to a temperature detection output of said temperature detecting means, and drives and controls said lens driving mechanism on the basis of the correction amount and the control information by using an output of said focus detecting means, so that the object image can be formed on the image forming plane of said optical system without shifting due to variations of temperature.

3. An optical apparatus for forming an object image on an image forming plane by using an optical system including a moving lens group for focus adjustment, said optical apparatus comprising:

a lens driving mechanism which drives said moving lens group;

a control circuit which drives and controls said lens driving mechanism on the basis of control information provided for driving and controlling said moving lens group; and temperature detecting means for detecting information on temperature, wherein said control circuit computes a correction amount by which a driving limit of said moving lens group toward a nearest-distance end or infinity-distance end for focus adjustment is variable, according to variations of temperature indicated by a temperature detection output of said temperature detecting means, and drives and controls said lens driving mechanism on the basis of the correction amount and the control information, so that the object image can be formed on the image forming plane of said optical system without shifting due to variations of temperature.

4. An optical apparatus for forming an object image on an image forming plane by using an optical system including a moving lens group for focus adjustment, said optical apparatus comprising:

a lens driving mechanism which drives said moving lens group;

a control circuit which drives and controls said moving lens group;

a storage circuit which stores therein control information provided for driving and controlling said moving lens group, temperature detecting means for detecting information on temperature; and focus detecting means for detecting a focusing state of said optical system, wherein said control circuit computes a correction amount by which a driving limit of said moving lens group toward a nearest-distance end or infinity-distance end for focus adjustment is variable, according to variations of temperature indicated by a temperature detection output of said temperature detecting means, and drives and controls said lens driving mechanism on the basis of the correction amount and the control information by using an output of said focus detecting means, so that the object image can be formed on the image forming plane of said optical system without shifting due to variations of temperature.

5. An apparatus according to claim 1, wherein the control information includes position data of said moving lens group obtained at a reference temperature and temperature coefficient data for correcting the position data of said moving lens group according to variations of temperature indicated by the temperature detection output of said temperature detecting means, and wherein said control circuit computes the correction amount by which the driving limit of said moving lens group toward the nearest-distance end or infinity-distance end for focus adjustment is variable, according to the variations of temperature indicated by the temperature detection output of said temperature detecting means and the temperature coefficient data, and drives and controls said lens driving mechanism on the basis of the correction amount and the position data of said moving lens group.

6. An apparatus according to claim 1, wherein said optical system is a zoom lens.

7. An apparatus according to claim 1, wherein said optical system includes first position detecting means for detecting a position of said moving lens group for focus adjustment, a moving lens group for variable magnification, and second position detecting means for detecting a position of said moving lens group for variable magnification.

8. An apparatus according to claim 1, wherein at least a part of said moving lens group of said optical system is a plastic lens.

9. An apparatus according to claim 2, wherein said optical system is a zoom lens.

10. An apparatus according to claim 3, wherein said optical system is a zoom lens.

11. An apparatus according to claim 4, wherein said optical system is a zoom lens.

12. An apparatus according to claim 2, wherein said optical system includes first position detecting means for detecting a position of said moving lens group for focus adjustment, a moving lens group for variable magnification, and second position detecting means for detecting a position of said moving lens group for variable magnification.

13. An apparatus according to claim 3, wherein said optical system includes first position detecting means for detecting a position of said moving lens group for focus adjustment, a moving lens group for variable magnification, and second position detecting means for detecting a position of said moving lens group for variable magnification.

14. An apparatus according to claim 4, wherein said optical system includes first position detecting means for detecting a position of said moving lens group for focus adjustment, a moving lens group for variable magnification, and second position detecting means for detecting a position of said moving lens group for variable magnification.

15. An apparatus according to claim 2, wherein at least a part of said moving lens group of said optical system is a plastic lens.

16. An apparatus according to claim 3, wherein at least a part of said moving lens group of said optical system is a plastic lens.

17. An apparatus according to claim 4, wherein at least a part of said moving lens group of said optical system is a plastic lens.

18. An optical apparatus for forming an object image on an image forming plane by using an optical system including a moving lens group for focus adjustment, said optical apparatus comprising:

a lens driving mechanism which drives said moving lens group;

a control circuit which drives and controls said lens driving mechanism on the basis of control information provided for driving and controlling said moving lens group; and humidity detecting means for detecting information on humidity, wherein said control circuit computes a correction amount by which a driving limit of said moving lens group toward a nearest-distance end or infinity-distance end for focus adjustment is variable, according to a humidity detection output of said humidity detecting means, and drives and controls said lens driving mechanism on the basis of the correction amount and the control information, so that the object image can be formed on the image forming plane of said optical system without shifting due to variations of humidity.

19. An optical apparatus for forming an object image on an image forming plane by using an optical system including a moving lens group for focus adjustment, said optical apparatus comprising:

a lens driving mechanism which drives said moving lens group;

a control circuit which drives and controls said moving lens group;

a storage circuit which stores therein control information provided for driving and controlling said moving lens group;

humidity detecting means for detecting information on humidity; and focus detecting means for detecting a focusing state of said optical system, wherein said control circuit computes a correction amount by which a driving limit of said moving lens group toward a nearest-distance end or infinity-distance end for focus adjustment is variable, according to a humidity detection output of said humidity detecting means, and drives and controls said lens driving mechanism on the basis of the correction amount and the control information by using an output of said focus detecting means, so that the object image can be formed on the image forming plane of said optical system without shifting due to variations of humidity.

20. An optical apparatus for forming an object image on an image forming plane by using an optical system including a moving lens group for focus adjustment, said optical apparatus comprising:

a lens driving mechanism which drives said moving lens group;

a control circuit which drives and controls said lens driving mechanism on the basis of control information provided for driving and controlling said moving lens group; and humidity detecting means for detecting information on humidity, wherein said control circuit computes a correction amount by which a driving limit of said moving lens group toward a nearest-distance end or infinity-distance end for focus adjustment is variable, according to variations of humidity indicated by a humidity detection output of said humidity detecting means, and drives and controls said lens driving mechanism on the basis of the correction amount and the control information, so that the object image can be formed on the image forming plane of said optical system without shifting due to variations of humidity.

21. An optical apparatus for forming an object image on an image forming plane by using an optical system including a moving lens group for focus adjustment, said optical apparatus comprising:

a lens driving mechanism which drives said moving lens group;

a control circuit which drives and controls said moving lens group;

a storage circuit which stores therein control information provided for driving and controlling said moving lens group;

humidity detecting means for detecting information on humidity; and focus detecting means for detecting a focusing state of said optical system, wherein said control circuit computes a correction amount by which a driving limit of said moving lens group toward a nearest-distance end or infinity-distance end for focus adjustment is variable, according to variations of humidity indicated by a humidity detection output of said humidity detecting means, and drives and controls said lens driving mechanism on the basis of the correction amount and the control information by using an output of said focus detecting means, so that the object image can be formed on the image forming plane of said optical system without shifting due to variations of humidity.

22. An apparatus according to claim 18, wherein the control information includes position data of said moving lens group obtained at a reference humidity and humidity coefficient data for correcting the position data of said moving lens group according to variations of humidity indicated by the humidity detection output of said humidity detecting means, and wherein said control circuit computes the correction amount by which the driving limit of said moving lens group toward the nearest-distance end or infinity-distance end for focus adjustment is variable, according to the variations of humidity indicated by the humidity detection output of said humidity detecting means and the humidity coefficient data, and drives and controls said lens driving mechanism on the basis of the correction amount and the position data of said moving lens group.

23. An apparatus according to claim 18, wherein said optical system is a zoom lens.

24. An apparatus according to claim 18, wherein said optical system includes first position detecting means for detecting a position of said moving lens group for focus adjustment, a moving lens group for variable magnification, and second position detecting means for detecting a position of said moving lens group for variable magnification.

25. An apparatus according to claim 18, wherein at least a part of said moving lens group of said optical system is a plastic lens.

26. An apparatus according to claim 19, wherein said optical system is a zoom lens.

27. An apparatus according to claim 20, wherein said optical system is a zoom lens.

28. An apparatus according to claim 21, wherein said optical system is a zoom lens.

29. An apparatus according to claim 19, wherein said optical system includes first position detecting means for detecting a position of said moving lens group for focus adjustment, a moving lens group for variable magnification, and second position detecting means for detecting a position of said moving lens group for variable magnification.

30. An apparatus according to claim 20, wherein said optical system includes first position detecting means for detecting a position of said moving lens group for focus adjustment, a moving lens group for variable magnification, and second position detecting means for detecting a position of said moving lens group for variable magnification.

31. An apparatus according to claim 21, wherein said optical system includes first position detecting means for detecting a position of said moving lens group for focus adjustment, a moving lens group for variable magnification, and second position detecting means for detecting a position of said moving lens group for variable magnification.

32. An apparatus according to claim 19, wherein at least a part of said moving lens group of said optical system is a plastic lens.

33. An apparatus according to claim 20, wherein at least a part of said moving lens group of said optical system is a plastic lens.

34. An apparatus according to claim 21, wherein at least a part of said moving lens group of said optical system is a plastic lens.

35. An optical apparatus for forming an object image on an image forming plane by using an optical system including a moving lens group for focus adjustment, said optical apparatus comprising:

a lens driving mechanism which drives said moving lens group;

a control circuit which drives and controls said lens driving mechanism on the basis of control information provided for driving and controlling said moving lens group;

temperature detecting means for detecting information on temperature; and humidity detecting means for detecting information on humidity, wherein said control circuit computes a correction amount by which a driving limit of said moving lens group toward a nearest-distance end or infinity-distance end for focus adjustment is variable, according to a temperature detection output of said temperature detecting means and a humidity detection output of said humidity detecting means, and drives and controls said lens driving mechanism on the basis of the correction amount and the control information, so that the object image can be formed on the image forming plane of said optical system without shifting due to variations of temperature and variations of humidity.

36. An optical apparatus for forming an object image on an image forming plane by using an optical system including a moving lens group for focus adjustment, said optical apparatus comprising:

a lens driving mechanism which drives said moving lens group;

a control circuit which drives and controls said moving lens group;

a storage circuit which stores therein control information provided for driving and controlling said moving lens group;

temperature detecting means for detecting information on temperature;

humidity detecting means for detecting information on humidity; and focus detecting means for detecting a focusing state of said optical system, wherein said control circuit computes a correction amount by which a driving limit of said moving lens group toward a nearest-distance end or infinity-distance end for focus adjustment is variable, according to a temperature detection output of said temperature detecting means and a humidity detection output of said humidity detecting means, and drives and controls said lens driving mechanism on the basis of the correction amount and the control information by using an output of said focus detecting means, so that the object image can be formed on the image forming plane of said optical system without shifting due to variations of temperature and variations of humidity.

37. An optical apparatus for forming an object image on an image forming plane by using an optical system including a moving lens group for focus adjustment, said optical apparatus comprising:

a lens driving mechanism which drives said moving lens group;

a control circuit which drives and controls said lens driving mechanism on the basis of control information provided for driving and controlling said moving lens group;

temperature detecting means for detecting information on temperature; and humidity detecting means for detecting information on humidity, wherein said control circuit computes a correction amount by which a driving limit of said moving lens group toward a nearest-distance end or infinity-distance end for focus adjustment is variable, according to variations of temperature indicated by a temperature detection output of said temperature detecting means and variations of humidity indicated by a humidity detection output of said humidity detecting means, and drives and controls said lens driving mechanism on the basis of the correction amount and the control information, so that the object image can be formed on the image forming plane of said optical system without shifting due to variations of temperature and variations of humidity.

38. An optical apparatus for forming an object image on an image forming plane by using an optical system including a moving lens group for focus adjustment, said optical apparatus comprising:

a lens driving mechanism which drives said moving lens group;

a control circuit which drives and controls said moving lens group;

a storage circuit which stores therein control information provided for driving and controlling said moving lens group;

temperature detecting means for detecting information on temperature;

humidity detecting means for detecting information on humidity; and focus detecting means for detecting a focusing state of said optical system, wherein said control circuit computes a correction amount by which a driving limit of said moving lens group toward a nearest-distance end or infinity-distance end for focus adjustment is variable, according to variations of temperature indicated by a temperature detection output of said temperature detecting means and variations of humidity indicated by a humidity detection output of said humidity detecting means, and drives and controls said lens driving mechanism on the basis of the correction amount and the control information by using an output of said focus detecting means, so that the object image can be formed on the image forming plane of said optical system without shifting due to variations of temperature and variations of humidity.

39. An apparatus according to claim 35, wherein the control information includes position data of said moving lens group obtained at a reference temperature and a reference humidity, temperature coefficient data for correcting the position data of said moving lens group according to variations of temperature indicated by the temperature detection output of said temperature detecting means and humidity coefficient data for correcting the position data of said moving lens group according to variations of humidity indicated by the humidity detection output of said humidity detecting means, and wherein said control circuit computes the correction amount by which the driving limit of said moving lens group toward the nearest-distance end or infinity-distance end for focus adjustment is variable, according to the variations of temperature indicated by the temperature detection output of said temperature detecting means, the temperature coefficient data, the variations of humidity indicated by the humidity detection output of said humidity detecting means and the humidity coefficient data, and drives and controls said lens driving mechanism on the basis of the correction amount and the position data of said moving lens group.

40. An apparatus according to claim 36, wherein the control information includes position data of said moving lens group obtained at a reference temperature and a reference humidity, temperature coefficient data for correcting the position data of said moving lens group according to variations of temperature indicated by the temperature detection output of said temperature detecting means and humidity coefficient data for correcting the position data of said moving lens group according to variations of humidity indicated by the humidity detection output of said humidity detecting means, and wherein said control circuit computes the correction amount by which the driving limit of said moving lens group toward the nearest-distance end or infinity-distance end for focus adjustment is variable, according to the variations of temperature indicated by the temperature detection output of said temperature detecting means, the temperature coefficient data, the variations of humidity indicated by the humidity detection output of said humidity detecting means and the humidity coefficient data, and drives and controls said lens driving mechanism on the basis of the correction amount and the position data of said moving lens group.

41. An apparatus according to claim 37, wherein the control information includes position data of said moving lens group obtained at a reference temperature and a reference humidity, temperature coefficient data for correcting the position data of said moving lens group according to variations of temperature indicated by the temperature detection output of said temperature detecting means and humidity coefficient data for correcting the position data of said moving lens group according to variations of humidity indicated by the humidity detection output of said humidity detecting means, and wherein said control circuit computes the correction amount by which the driving limit of said moving lens group toward the nearest-distance end or infinity-distance end for focus adjustment is variable, according to the variations of temperature indicated by the temperature detection output of said temperature detecting means, the temperature coefficient data, the variations of humidity indicated by the humidity detection output of said humidity detecting means and the humidity coefficient data, and drives and controls said lens driving mechanism on the basis of the correction amount and the position data of said moving lens group.

42. An apparatus according to claim 38, wherein the control information includes position data of said moving lens group obtained at a reference temperature and a reference humidity, temperature coefficient data for correcting the position data of said moving lens group according to variations of temperature indicated by the temperature detection output of said temperature detecting means and humidity coefficient data for correcting the position data of said moving lens group according to variations of humidity indicated by the humidity detection output of said humidity detecting means, and wherein said control circuit computes the correction amount by which the driving limit of said moving lens group toward the nearest-distance end or infinity-distance end for focus adjustment is variable, according to the variations of temperature indicated by the temperature detection output of said temperature detecting means, the temperature coefficient data, the variations of humidity indicated by the humidity detection output of said humidity detecting means and the humidity coefficient data, and drives and controls said lens driving mechanism on the basis of the correction amount and the position data of said moving lens group.

* * * * *

UNITED STATES PATENT AND TRADEMARK OFFICE
CERTIFICATE OF CORRECTION

PATENT NO. : 6,023,589
DATED : February 8, 2000
INVENTOR(S) : Seiya Ohta

It is certified that error appears in the above-identified patent and that said Letters Patent are hereby corrected as shown below:

Col. 2, line 11, delete "cut" and insert -- out --.

Signed and Sealed this

Seventeenth Day of April, 2001

Attest:

NICHOLAS P. GODICI

Attesting Officer

Acting Director of the United States Patent and Trademark Office